United States Patent [19]

Pick

[11] 4,185,282
[45] Jan. 22, 1980

[54] DISPLAYED KEYBOARD INDICIA

[75] Inventor: George G. Pick, Mendham, N.J.

[73] Assignee: AM International, Inc., Los Angeles, Calif.

[21] Appl. No.: 802,896

[22] Filed: Jun. 2, 1977

[51] Int. Cl.² .............................................. G06F 3/14
[52] U.S. Cl. ................................ 340/711; 340/365 R; 340/705; 340/721; 340/748; 358/92
[58] Field of Search ......................... 358/142, 92, 146; 340/365 R, 365 C, 711, 705, 721, 723, 748, 750

[56] References Cited

U.S. PATENT DOCUMENTS

| | | | |
|---|---|---|---|
| 3,637,926 | 1/1972 | Morchand | 358/142 |
| 3,670,322 | 6/1972 | Mallebrein | 340/365 |
| 3,879,722 | 4/1975 | Knowlton | 340/365 R |
| 3,927,250 | 12/1975 | Raingen | 358/146 |
| 3,968,501 | 7/1976 | Gilbert | 354/7 |
| 4,006,291 | 2/1977 | Imsland | 358/92 |

Primary Examiner—Marshall M. Curtis
Attorney, Agent, or Firm—Robert S. Hulse; Ray S. Pyle

[57] ABSTRACT

A keyboard entry device with video display for multiple language use. A language selector establishes the language mode of the machine, and the entire keyboard font is displayed on the video screen in the relationship of the keys on the keyboard. Display is either at operator request or machine controlled intervals and may be displayed on only part of the screen or the text being composed may be temporarily removed from the screen and the entire screen used to display the characters in a key related position. Thus, the operator has the capability of locating keys while learning the new keyboard relationship, or refreshing memory for reassurance.

4 Claims, 4 Drawing Figures

DISPLAYED KEYBOARD INDICIA

SYNOPSIS OF THE INVENTION

The advantage of this invention is that the blank keyboard is readily associated with a display of character on a screen and therefore, whenever a language change is made, the new language font distribution on the keyboard keys is displayed on the screen for a time sufficient for operator memorization and/or refresh.

IN THE DRAWINGS

DESCRIPTION OF THE PREFERRED EMBODIMENT

Figure 1:
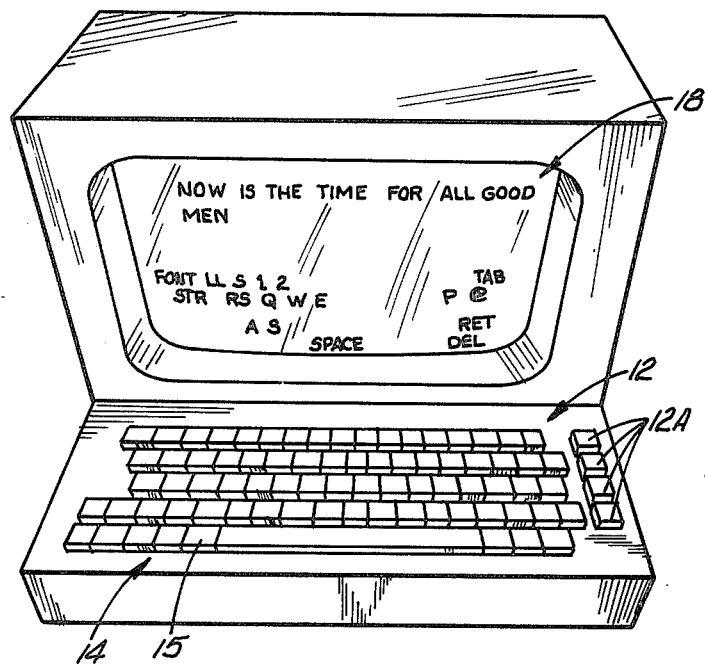
FIG. 1 is a front view of a keyboard entry device with a videoscreen, showing blank keys and a font array displayed upon the screen beneath the text composition taking place thereabove.
Figure 2:
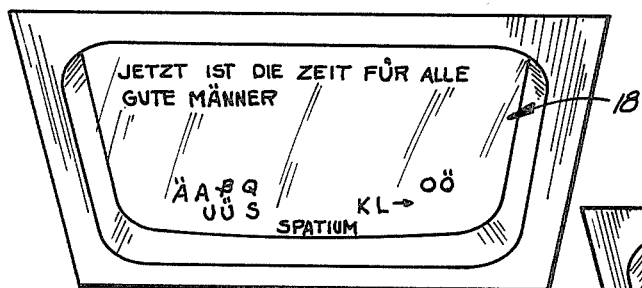
FIG. 2 is the same screen as in FIG. 1 with the display in the German language.

FIG. 1 illustrates a keyboard 12 as used on a well-known popular brand of direct entry photocomposition machine, with the exception that all the key caps are blank. In addition, there is shown a series of four select keys 12-A which are not on the known machines, and are used for language select to call out the language which is to be employed.

The character keys are referred to by reference number 14 and each has a top key cap 15.

Figure 4:
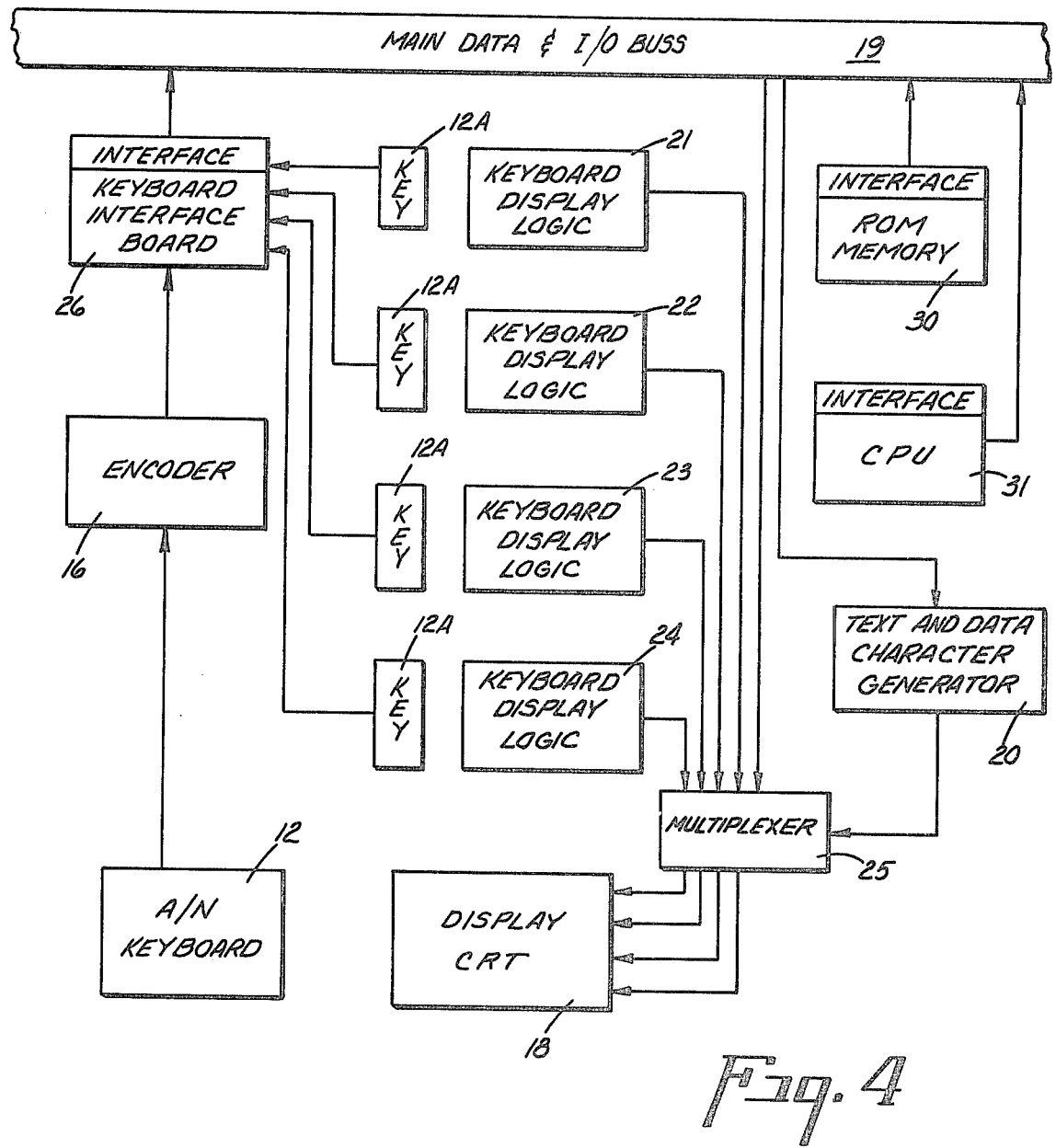
FIG. 4 is a simplified illustration of the modification of conventional control circuitry of a photocomposition machine embodiment of the invention.

FIG. 4 of the drawings shows a single symbol for an encoder 16, but in actual construction there is a single Hall effect circuit encoder for each key which produces a unique digital output code for that particular key location.

It is common practice to provide such an encoder 16 operating through an interface to cause a memory and a character generator to display a character upon a display cathode ray tube. This invention employs such a display CRT 18. The means for generating the particular character to be displayed, however, differs from the prior practice.

A text and data character generator 20 having all capability of generating the text in characters for the number of languages to be displayed is shown in FIG. 4. Normally such character generator 20, serving one language only, would contain a portion which would serve as a keyboard display logic. However, in order to accomplish the purposes of this invention, separate logic boards 21-24 are provided. Each of the keyboard display logic boards operate through a multiplexer 25 to cooperate with the character generator 20 in order to display a particular selected language.

When select keys 12-A are actuated, to select a particular language resident in the logic board 21-24, a keyboard interface board and its interface circuitry operate through buss 19, to access a ROM memory 30 and the program of a central process unit 31 to thereby select a particular character of a particular language from the selected keyboard logic and the text and character generator board 20 to display on the CRT 18 the entire keyboard layout for that language.

In the Preferred Embodiment, the CPU 31 is a commercially available microprocessor such as the Intel Corporation No. 8008 Microprocessor Chip. The CPU 31 together with the ROM 30 provide handling of all input commands and type character key strokes selected by the operator. In addition the processor handles the entry of all keyboard data into the display portion of the memory or display by the CRT.

All information displayed on the CRT is provided from the selected one of the four keyboards display logic boards in cooperation with the text and data character generator 20. A large portion of the access memory may be contained in the keyboard display logic. There are storage locations in the display memory used for keyboard buffers and for scratch pad purposes, such as storing data utilized by the CPU. All of this information is variable according to the language being displayed and is contained in the memory of the character generator board. All functions, values, commands, and type characters selected by the operator are entered into the memory through the keyboard interface board. Data from the CPU also passes the keyboard interface board by way of the main data buss. This is known art, as detailed specifically in U.S. Pat. No. 3,968,501.

Therefore, this invention provides a universal keyboard indicia system which comprises generally a keyboard with individual keys each having a signal producing member. Each key has a manual receptor key cap which is blank. The information display means may be a CRT, often referred to as a videotube, for receiving control information from a selected character generator to display the representation of the generator content. The content, which is called out upon command is of a keyboard array of indicia on the display means CRT videotube for at least a period of time to be subliminally impressed upon an operator. That is, the display might be for a period of time, or at intervals of time, and those intervals may be sufficiently short to be considered subliminal.

Figure 3:
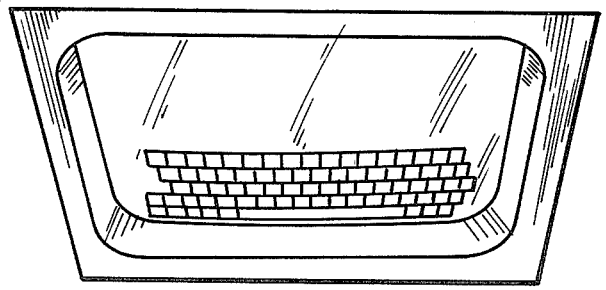
FIG. 3 is an alternative embodiment which includes simulated key shapes, each for display of a character within the shape.

The FIG. 3 illustration is a block diagram without character forms illustrated within the blocks. Because of size limitations, the blocks have been left blank with the understanding that the particular language selected by the keyboard display logic board 21-24 will be displayed in the blanks and thereby not only illustrate relative position but actual key formations for better association by the operator.

What is claimed is:
1. A keyboard indicia system comprising:
   a keyboard having a plurality of blank keys and language selector keys, the language selector keys being disposed for selecting one of a plurality of languages;
   at least one character generator coupled to the keyboard for producing a font of indicias corresponding to a selected language in response to actuation by an operator of one of the language selector keys; and
   information display means coupled to the keyboard and to said character generators for displaying the indicias in a manner corresponding to keys of the keyboard such that each displayed indicia represents a label for a blank key.

2. The system as in claim 1 wherein the indicias are displayed at frequent intervals, each interval spanning a selected short period of time permitting the indicias to be subliminaly impressed upon an operator.

3. The system as in claim 1 including a program driven CPU, a ROM memory and a data and input-output buss.

4. The system as in claim 3 further including an encoder, at least one keyboard display logic, and a multiplexer.

* * * * *